(12) United States Patent
Nakajima

(10) Patent No.: US 6,195,549 B1
(45) Date of Patent: Feb. 27, 2001

(54) DIGITAL MOBILE COMMUNICATION SYSTEM

(75) Inventor: Keiichi Nakajima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/044,010

(22) Filed: Mar. 19, 1998

(30) Foreign Application Priority Data

Jul. 23, 1997 (JP) .................................................. 9-212601

(51) Int. Cl.⁷ ...................................................... H04Q 7/20
(52) U.S. Cl. ......................... 455/424; 455/423; 455/67.1; 455/445
(58) Field of Search .................................. 455/424, 423, 455/445, 560, 561, 67.1, 455

(56) References Cited

U.S. PATENT DOCUMENTS

| | | | |
|---|---|---|---|
| 4,926,421 | * 5/1990 | Kawano et al. | 370/331 |
| 5,134,643 | * 7/1992 | Iwata | 455/423 |
| 5,175,866 | 12/1992 | Childress et al. | 455/8 |
| 5,383,221 | * 1/1995 | Akita et al. | 375/219 |
| 5,437,056 | * 7/1995 | Rautiola | 455/452 |
| 5,481,591 | * 1/1996 | Suzuki | 455/456 |
| 5,535,425 | * 7/1996 | Watanabe | 455/436 |
| 5,612,991 | 3/1997 | Nair et al. | 455/423 |
| 5,752,161 | * 5/1998 | Jantti et al. | 455/8 |
| 5,754,958 | * 5/1998 | Tsuji et al. | 455/436 |
| 5,845,209 | * 12/1998 | Iwata | 455/423 |

FOREIGN PATENT DOCUMENTS

0714217A2    5/1996   (EP) .

OTHER PUBLICATIONS

Abstract—"Default Wide Area Trunking", Norwood and Stefans; Motor, Inc., Technical Development, Nov. 1996; p. 71 and 72.

PN–3502, "W–CDMA (Wideband Code Division Multiple Acees) Air Interface Compatibility Standard for 1.85 to 1.99 GHz PCS Applications". Source—TAG–7 (W–CDMA TAG). Distribution—Participants in the Joint Technical Committee Technical Ad Hoc Group No. 7 (TAG–7). Apr. 20, 1995, pp. C–1 through 4–42.

"Digital Land Mobile Telecommunication System for Public Utilities", Arib Standard. Published by the Association of Radio Industries and Businesses. Chapter 2, pp. 3–4, and Chapter 3, p. 11.

"Digital Land Mobile Telecommunication System for Public Utilities", RCR STD–39. Published by the Association of Radio Industries and Businesses. Chapter 2 pp. 3–7.

* cited by examiner

Primary Examiner—Nay Maung
Assistant Examiner—Erika A. Gary
(74) Attorney, Agent, or Firm—Rabin & Champagne, P.C.

(57) ABSTRACT

The base station 6 incorporates the line supervisor 8, the line switch 9, and the signal returner 10. If there is originated a call request signal for the mobile station 3 by the mobile station 2 after occurrence of a break in the line between the base station 6 and the control station 21, the line supervisor 8 notifies the line switch 9 of the line switch signal. In response to the line switch signal, the line switch 9 actuates the signal returner 10. Thereafter, the signal returner 10 returns the call request signal over the base station zone of the base station 6. This enables communication among the mobile stations 2 and 3 laid in the base station zone of the base station 6.

4 Claims, 6 Drawing Sheets

DIGITAL MOBILE COMMUNICATION SYSTEM

BACKGROUND OF THE INVENTION

1. Field of the Invention

The present invention relates to a digital mobile communication system which is used for public business digital mobile communications and the like.

2. Description of the Prior Art

Recently, information communication technologies have rapidly developed. In particular, mobile communication technology in the radio communication field has remarkably rapidly developed, as has optical communication technology in the wire communication field.

Mobile communications are commonly categorized into commercial communications and non-commercial communications. Among the former communications, there are typically cordless telephones and portable telephones. Among the latter communications, there are typically taxi radio communication, MCA (Multi-Channel Access) land mobile radio communication systems, and public business digital mobile communication systems.

If there arises a disaster, the public business digital mobile communication system considerably serves for transmission of information on the disaster, in contrast with the other communication systems or networks which might malfunction. Accordingly, for communications during a disaster, which are mainly performed by a base station and mobile stations communicating therewith a public business digital mobile communication system, is essential.

Incidentally, in a conventional mobile communication system, e.g., the public business digital mobile communication system, the communication among the mobile stations requires the base station. More specifically, the mobile stations always communicate with each other via the base station, A plurality of base stations are arranged at given distances between them. Each base station has a base station zone to control communication therein. Those base stations are controlled by a control station.

Communication between a mobile station and another mobile station requires a path via two base stations and one control station. For example, there is needed a path like the former mobile station - a first base station - a control station - a second mobile station - the latter base station. Even though the former mobile station and the latter mobile station exit simultaneously in the first base station zone, the communication therebetween requires a path like the former mobile station - the first base station - the control station - the first base station - the latter mobile station. In other words, the control station serves for any communication among any base stations.

In general, base stations are positioned on tops of mountains in order to give larger base station zones, which preferably do not require the presence of any person. In consequence, the base stations require a simple structure immune to a failure or a fault.

In a disaster, however, in the case where there occurs a break in the line between a base station and a control station, even though the base station functions regularly, mobile stations simultaneously positioned within the base stations zone of the base station fail to communicate with each other.

SUMMARY OF THE INVENTION

It is therefore the object of the present invention to provide a digital mobile communication system which is capable of elevated reliability.

The present invention relates to a digital mobile communication system in which base station carries out radio communication with a mobile station positioned in the base station zone of one base station and repeats communication between the mobile station and another mobile station positioned in either the base station zone of the base station or the one base station zone of an other base stations via a control station, serving as an upper layer, the system comprising:

a line supervision circuit monitoring a line between the one base station and the control station to prepare a line switch signal for switching the line upon detection of a break in the line; a signal return circuit returning a signal received from the mobile station to radiate the signal over the base station zone of the base one station; and a line switch circuit actuating the signal return circuit in response to the line switch signal.

Another invention relates to a digital mobile communication system as defined above, further comprising a communication circuit radiating the signal received from the mobile station to carry broadcast information to all of the mobile stations over the base station zone of one base station.

Another invention relates to a digital mobile communication system in which a base station carries out radio communication with a mobile station laid in the base station zone of the base station and repeats communication between the mobile station and another mobile station laid in one of the base station zone of the base station and the base station zone of one of other base stations via a control station serving as an upper layer, the system comprising a signal return circuit returning a signal received from the mobile station to radiate the signal over the base station zone of the base station.

And another invention relates to a mobile communication system including a base station handling a signal for communication between a first mobile station and a second mobile station both of which are positioned in the base station zone of the base station, and a control station exchanging the signal with the base station based upon data for managing the communication, the base station comprising:

a receipt circuit receiving the signal from the first mobile station; a transmission circuit transmitting the signal to the control station; a radiation circuit radiating the signal toward the second mobile station;

and a permission/inhibition circuit inhibiting the transmission circuit from transmitting the signal to the control station and permitting the radiation circuit to radiate the signal toward the second mobile station, according to a request.

DESCRIPTION OF THE PREFERRED EMBODIMENTS

Hereinafter, the preferred embodiments of the digital mobile communication system according to the present invention will be described in detail with reference to the accompanying drawings.

Prior to explaining the preferred embodiments, the public business digital mobile communication system will be briefly discussed for easy understanding of the invention.

Figure 3:
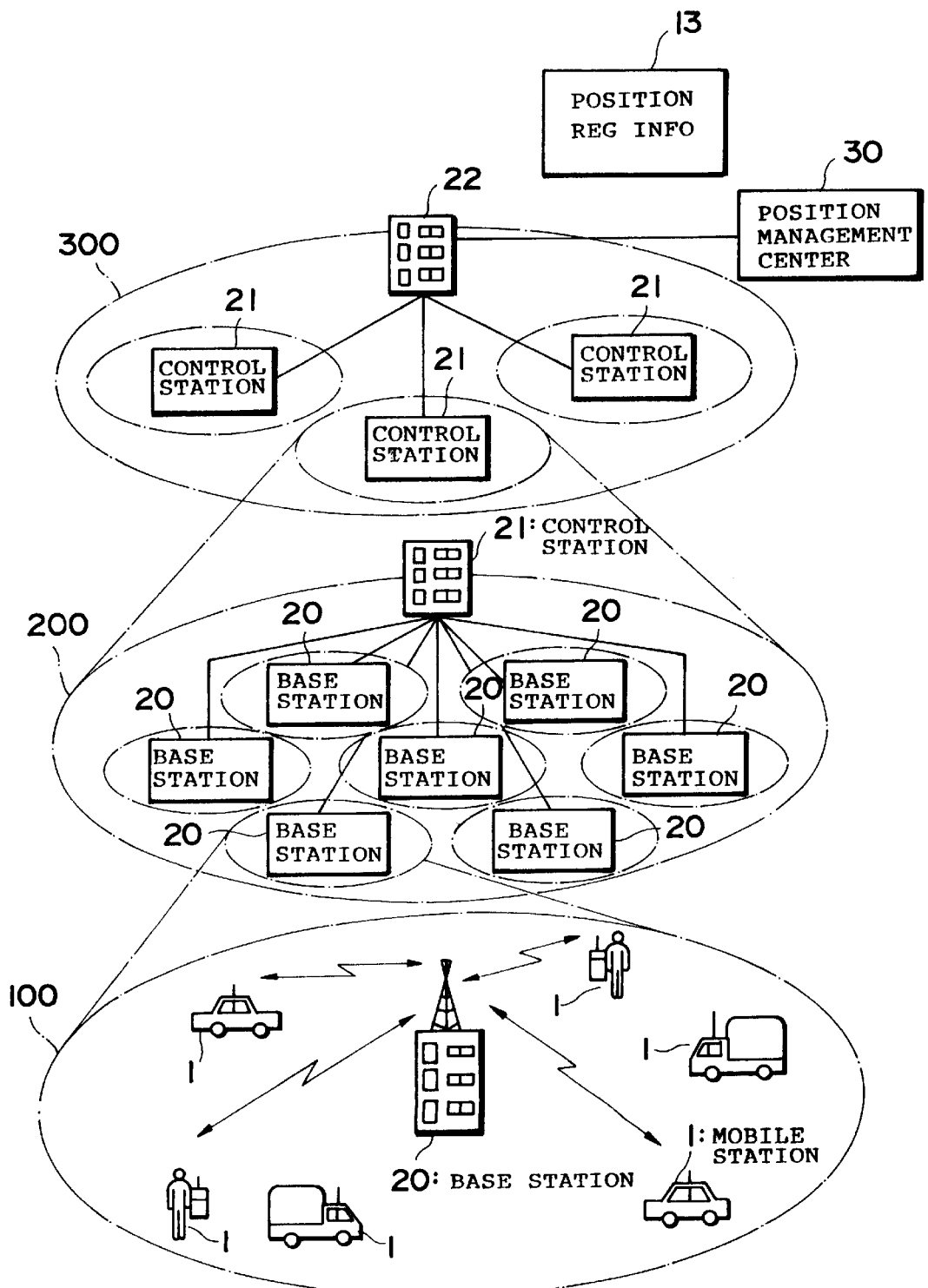
FIG. 3 is a diagram showing a public business digital mobile communication system.

In FIG. 3, the control station system 300 mainly incorporates a plurality of base station systems 200, and also each base station system 200 mainly incorporates a plurality of base systems 100.

The basic system 100 incorporates a base station 20 and a plurality of mobile stations 1 disposed in the base zone of the base station 20. The base station 20 controls the plurality of mobile stations 1 to allow their communications. In moving or stopping, the mobile stations 1 carry out their communications. Typical of the mobile stations 1 is a portable telephone and a PHS telephone.

The base station system 200 incorporates a control station 21 and a plurality of basic station systems 100. The control station 21 controls each base station 20 to allow it to manage the mobile stations 1 disposed in its base zone. Such a construction serves to enlarge the service area in which the business digital mobile communication system is available.

The control station system 300 incorporates a control center 22 and a plurality of base station system 200. The control center 22 controls each controls station 21 to allow it to manage the base stations 20 povided in its control zone.

Figure 4:
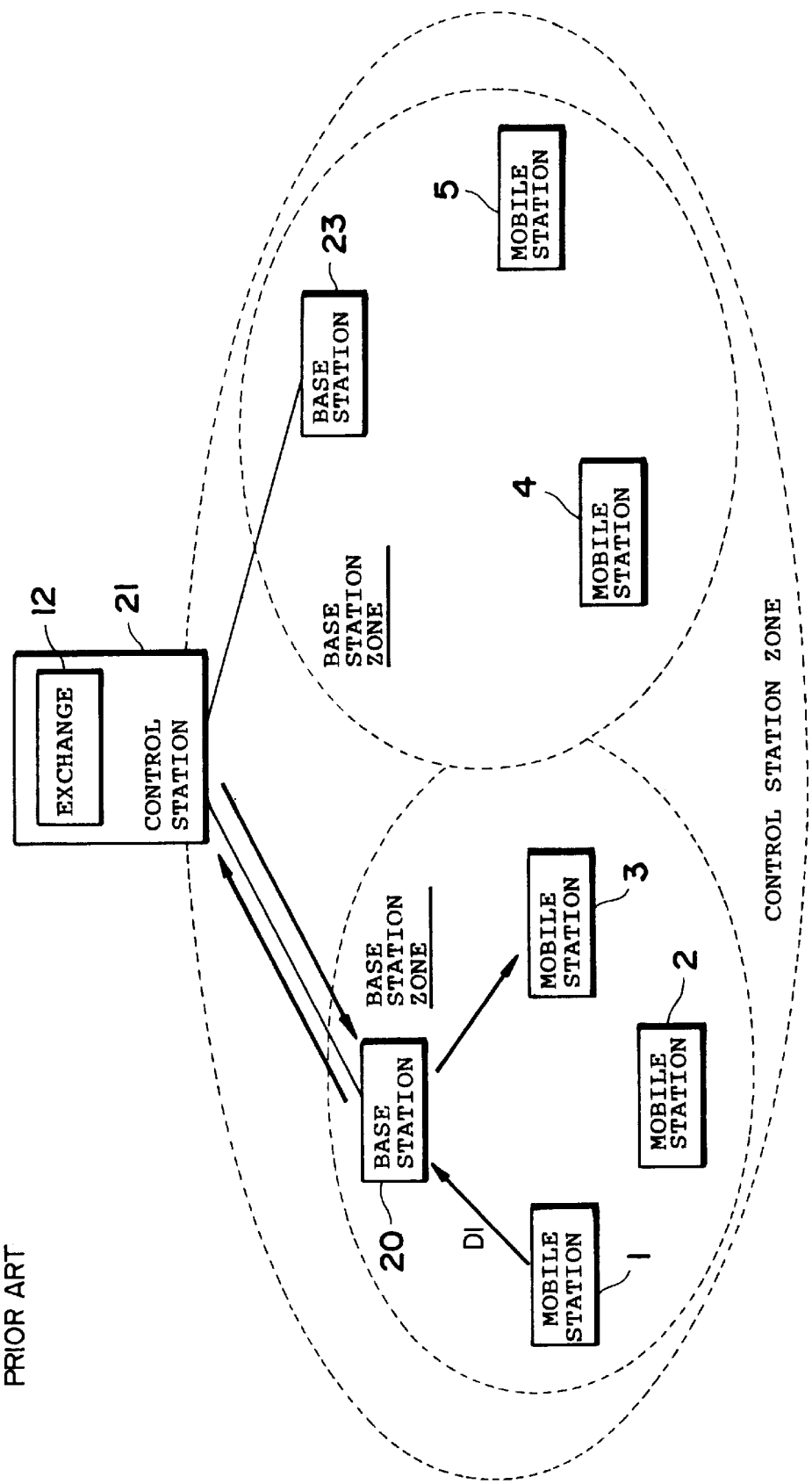
FIG. 4 is a diagram showing communication in the same base station zone.

Subsequently, the operation of the public business digital mobile communication system will be described. First, the signal flow will be described. As shown in FIG. 4, it is assumed that the data D1 including the ID (Identification Data) of the mobile station 3 is transmitted thereto from the mobile station 1. The data D1 is sent to the control station 21 via the base station 20. The control station 21 detects the base station zone in which the mobile station 3 is disposed at present, with reference to the position registration information 13 based upon the ID affixed to the data D1. Since the destination mobile station 3 and the origination mobile station 1 exist in the same base station zone, the control station 21 returns to the base station 20 the data D1, and is forwarded to the destination mobile station 3.

Figure 5:
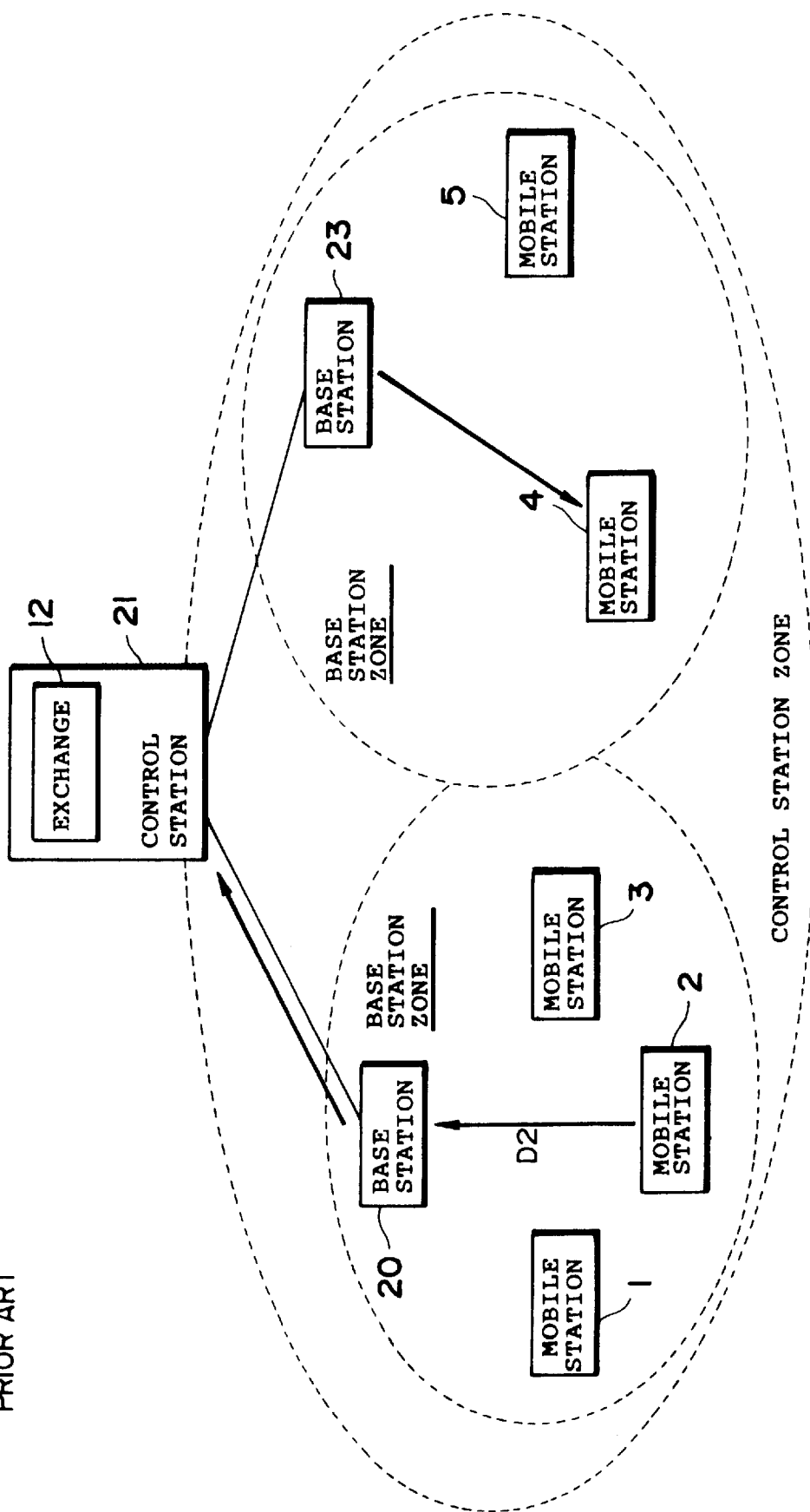
FIG. 5 is an diagram showing communication between different base stations.

As shown in FIG. 5, it is now assumed that the data D2 with the ID of the mobile station 4 is transmitted thereto from the mobile station 2. The ID attached to the data D2 is transferred to the control station 21 via the base station 20. The control station 21 detects the base station zone in which the mobile station 4 is now disposed, with reference to the position registration information 13 on the basis of the ID attached to the D2. As a result, the control station 21 sends the data D2 to the base station 23, thus reaching the mobile station 4.

Figure 6:
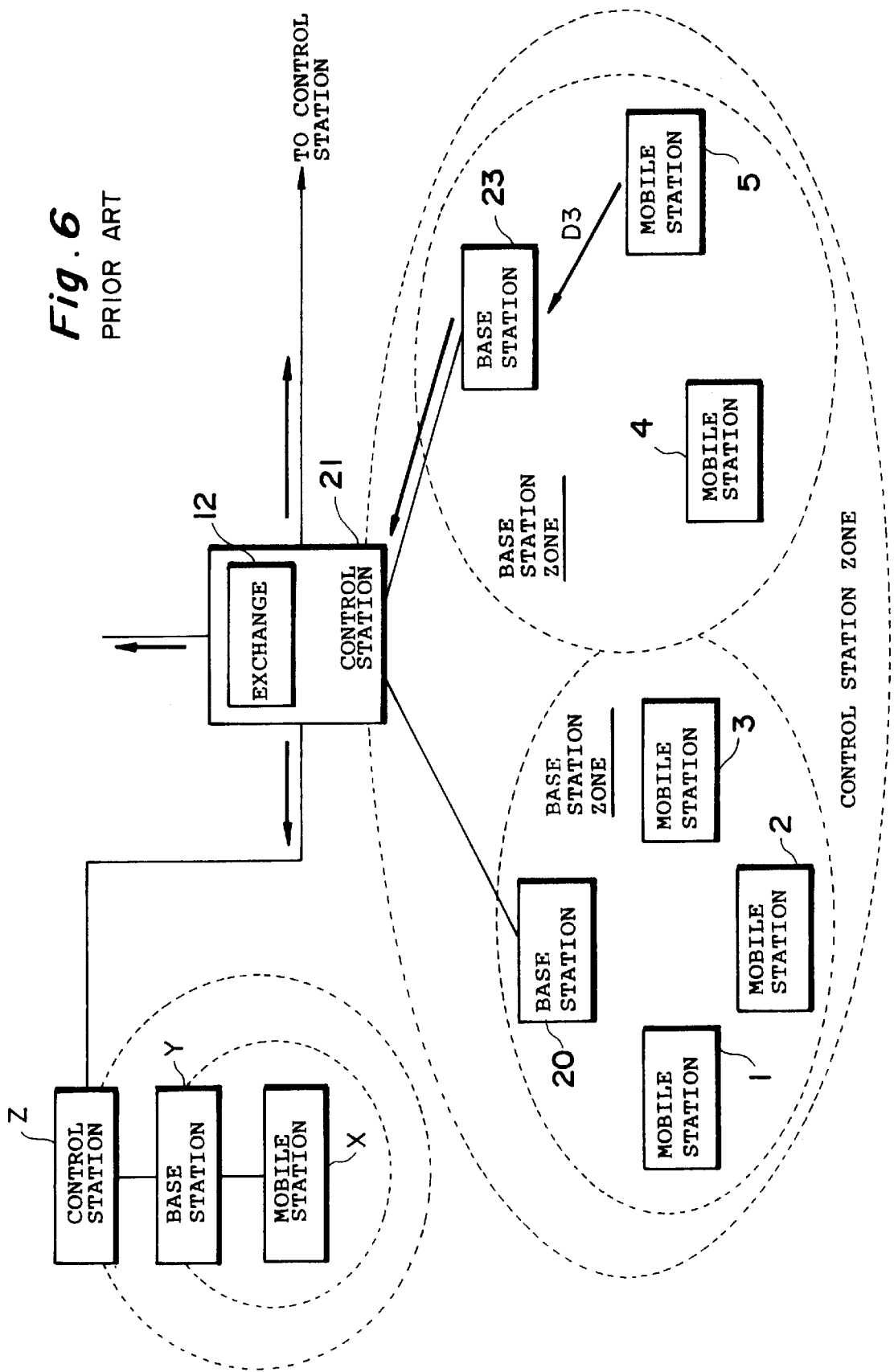
FIG. 6 is a diagram showing communication between different control stations.

In FIG. 6, it is assumed that the data D3 having the ID of the mobile station X is transmitted thereto from the mobile station 5. The mobile station X and the mobile station 5 are controlled by the respective control station stations Z and 21. The data D3 is sent to the control station 21 via the base station 23. The control station 21 detects the control station Z having the base station Y by which the mobile station X is controlled at present, referring to the position registration information 13 based upon the ID attached to the data D3. The control station 21 sends the data D3 to the mobile station X.

Incidentally, the position registration information 13 is indicative of the position of each mobile station. More definitely, the position registration information 13 represents the base station zones in which a mobile station is disposed and the control stations in which the mobile station is disposed in. Registration of positions of mobile stations is carried out as follows. Registration is performed upon turning on a mobile station and upon movement of the mobile station from one base station zone to another base station zone, which employs a position registration signal that the mobile station radiates.

Position registration signals are collected by the position management center 30 (see FIG. 3), wherein no other center or the like exists. The position management center 30 detects the current position of each mobile station based upon the position registration signal received therefrom.

It is assumed that a disaster breaks the line between a base station and a control station. In such a case, the position registration signal radiated by the base station cannot reach the position management center 30 so as to fail in registering the position of the mobile station. This causes the communication of each mobile station disposed in the base station zone of the base station to malfunction.

First Embodiment

Figure 1:
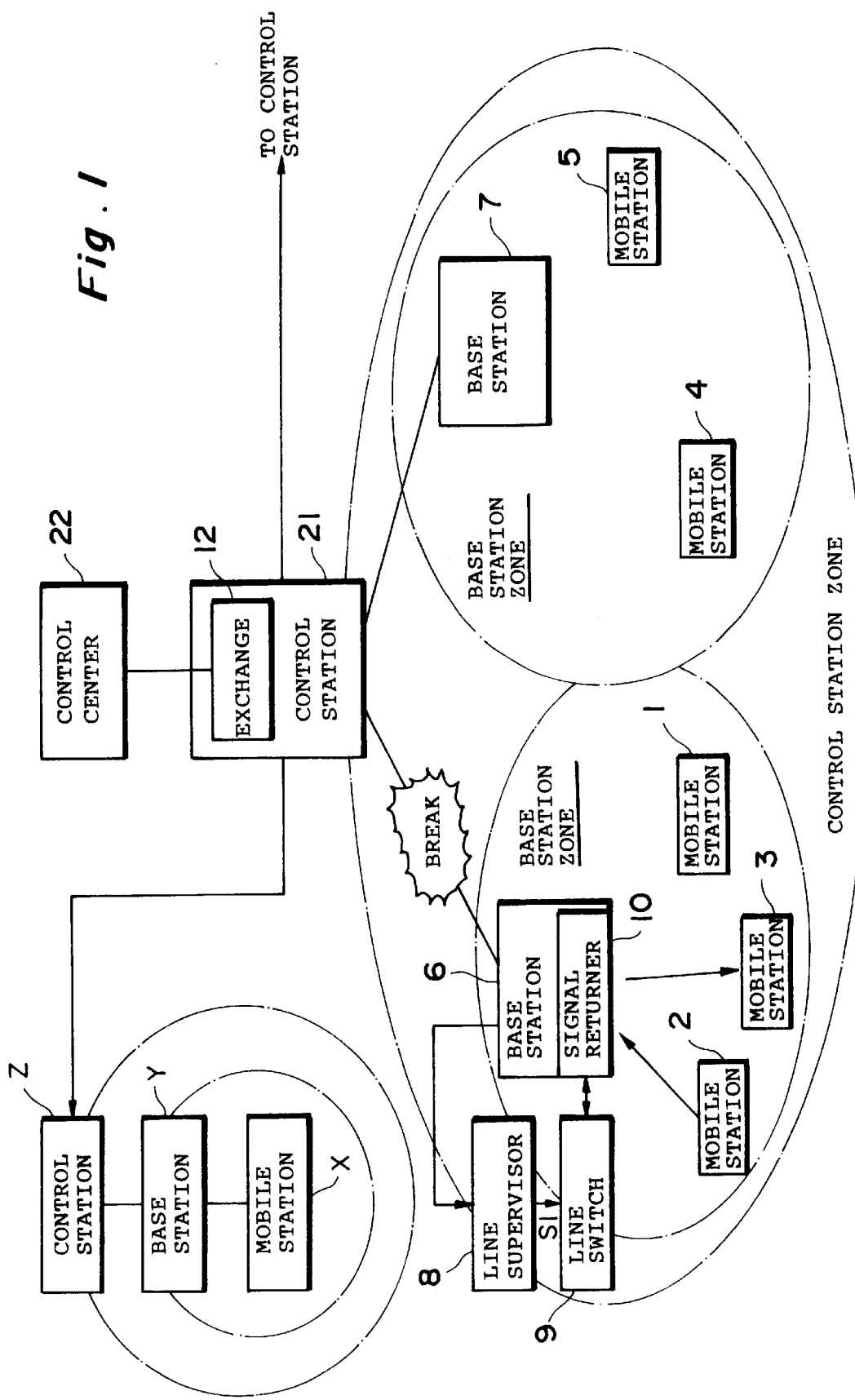
FIG. 1 is a diagram showing a base station according to the first embodiment.

Having briefly discussed the public business digital mobile communication system, the base station according to the first embodiment will be described below. In FIG. 1, the base station 6 for use in the public business digital mobile communication system of the first embodiment incorporates the line supervisor 8, the line switch 9, and the signal returner 10. The line supervisor 8 regularly monitors the line between the base station 6 and the control station 21, and sends the line switch signal S1 to the line switch 9 upon occurrence of trouble in the line, e.g., a break in the line or an increase in noise. The line switch 9 actuates the signal returner 10 upon receipt of the line switch signal S1 from the line supervisor 8. The signal returner 10 returns a call request signal to the base station zone of the base station 6, when the call request signal is originated by a mobile station disposed therein.

As discussed above, essentially, for example, a call request signal for the mobile station 3 originated by a mobile station 2 should reach the control station 21 via the base station 6. Thereby, the control station 21 confirms the position of the mobile station 2 to send the call request signal to the mobile station 3 via the base station 6, whereby the line between the mobile station 2 and the mobile station 3 is established.

However, the explanation below will proceed on assumption that after there occurs a break in the line between the base station 6 and the control station 21, there is originated a call request signal by the mobile station 2 to the mobile station 3. In this case, the line supervisor 8, having already detected the break, gives a line switch signal S1 to the line switch 9, which actuates the signal returner 10. Upon actuation, the signal returner 10 radiates the call request signal toward the base station zone of the base station 6. Accordingly, the line between the mobile station 2 and the mobile station 3 can be established.

Hereinafter, it is assumed that there occurs a call request signal from the mobile station 2 to the mobile station 4 after there occurs a break in the base station 6 and the control station 21, in which the mobile station 2 and the mobile station 4 are controlled by the respective base stations 6 and 7. As discussed above, the base station 6 essentially receives the call request signal and sends it to the control station 21, whereby the call request signal should be transmitted to the mobile station 4 from the control station 21 via the base station 7.

The break in the line between the base station 6 and the control station 21 prevents a line between the mobile station 2 and the mobile station 4 from being established. Here, the line supervisor 8 detects the break to send the line switch signal S1 to the line switch 9. Upon receipt of the line switch signal S1, the line switch 9 actuates the signal returner 10. Upon actuation, the signal returner 10 radiates the call request signal toward the base station zone of the base station 6. However, since the ID involved in the radiated call request signal designates the mobile station 4 positioned in another base station zone, that is the zone of the base station 7, the line between the mobile station 2 and the mobile station 4 cannot be established while the break in the line between the base station 6 and the control station 21 remains.

Moreover, it is assumed that after there arises a break in the line between the base station 6 and the control station 21, there is originated a call request signal for the mobile station X disposed in the base station Y, by the mobile station 2 disposed in base station zone of the base station 6. As discussed above, the base station 6 essentially transfers the call request signal from the mobile station 2 to the control station 21, whereby the line call request signal is sent to the mobile station X via the control station Z and the base station Y.

However, the transmission of the call request signal is prevented by the break in the line between the base station 6 and the control station 21. Then, the line supervisor 8, having already detected the break, sends to the line switch signal S1 to the line switch 9, which actuates the signal returner 10. The signal returner 10 radiates the call request signal over the base station zone of the base station 6. The ID contained in the radiated call request signal specifies the mobile station X in the base station zone of the base station Y, whereby a call between the mobile station 2 and the mobile station X cannot be established while the break in the line between the base station 6 and the control station 21 remains.

As described foregoing, the digital mobile communication system of the first embodiment provides the following effects. The system enables the communication between a mobile station and another mobile station both in the same base station even while a break remains in the line between the control station and the base station. Moreover, the system enables communication between a mobile station and another mobile station that has moved into the same base station zone or started to function therewithin. Therefore, the system can serves to provide the disaster relief activity as the public business mobile communication system.

Second Embodiment

Figure 2:
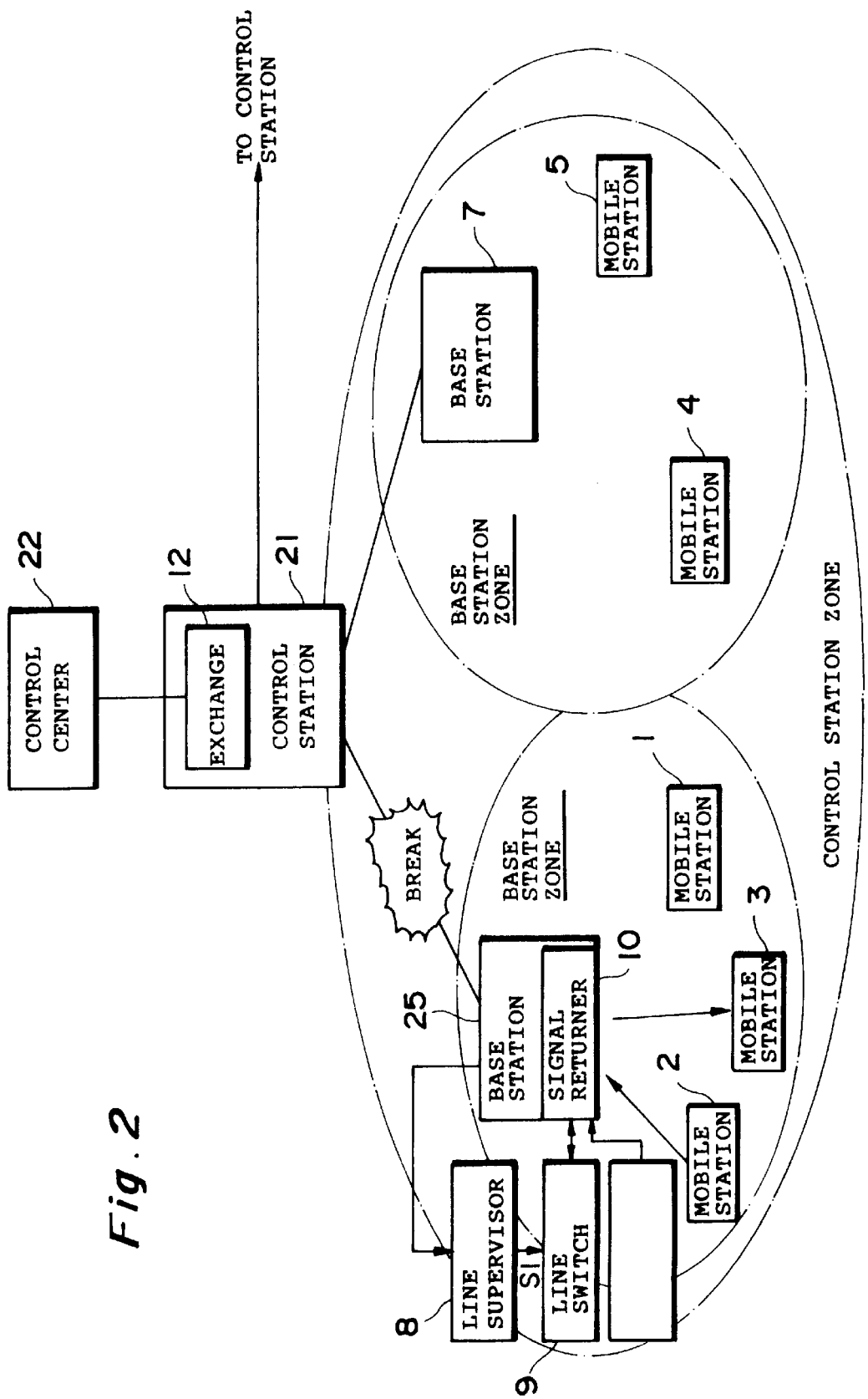
FIG. 2 is a diagram showing a base station according to the second embodiment.

Hereinafter, the second embodiment of the public business digital mobile communication system will be described with reference to FIG. 2. The base station 25 for use in the public business digital mobile communication system according to the second embodiment is provided with the communicator 26, which is the feature thereof while the other components and functions are the same as those of the first embodiment. Accordingly, the difference between the first and second embodiments will be explained in detail below.

The communicator 26 communicates with a mobile station disposed in the base station zone of the base station 25. Upon occurrence of a disaster, this function enables instructing the disaster relief activity to a mobile station laid in the base station zone of the base station 25 and broadcasting information on the disaster to all of the mobile stations.

As discussed above, if there arises no break in the line between the base station 25 and the control station 21, for example, the base station 25 transfers a call request signal for the mobile station 3 originated by the mobile station 2 to the control station 21. The call request signal should return to the base station zone of the base station 25 from the control station 21 to be radiated thereover. The ID lying in the radiated call request signal specifies the mobile station 3 disposed in the base station zone of the base station 25, allowing the establishment of the connection.

However, it now is assumed that there arises a call request signal by the base station 25 to the mobile station 3 after occurrence of a break in the line between the base station 25 and the control station 21. The break does not allow the connection. However, the line supervisor 8, which has already detected the break, sends the line switch signal S1 to the line switch 9. The line switch 9 actuates the signal returner 10. After the actuation of the signal returner 10, the ID involved in the call request signal is radiated over the base station zone of the base station 25. Since the ID designates the mobile station 3 disposed in the base station zone of the base station 25, the connection between the base station 25 and the mobile station 3 can be established.

In addition to the effects of the first embodiment, the digital mobile communication system provided with the communicator 26 according to the second embodiment gives the following effects. The system enables the base station to control communication among the mobile stations present in the base station zone thereof, even though there arises a break in the line between the control station and the base station. In consequence, when there occurs a disaster, this makes it possible to instruct a mobile station on the disaster relief and to carry broadcast information on the disaster to all of the mobile stations.

In another embodiment, this system is available for direct communication among the mobile stations at any time. The direct communication means that the mobile stations can make mutual communication with each other through the mediation of the base stations, without the control of the control station.

For this purpose, the base station provides a receipt circuit receiving the signal from one mobile station, a radiation circuit radiating the signal toward another mobile station, and a transmission circuit transmitting the signal between the base station and the control station.

In addition, the base station provides a permitting/inhibiting circuit. At anytime, the request for direct communication is available. An operator makes the request. According to the request, the permitting/inhibiting inhibits the transmission circuit from transmitting the signal to the control station and permits the radiation circuit to radiate the signal toward another mobile station directly.

The system enables the base station anytime to control the direct communication among the mobile stations present in the base station zone, whether there arises a break in the line between the control station and the base station or not.

As described above, in the digital mobile communication systems of the first and second embodiments, returning a call request signal depends upon the condition of the line between the base station and the control station. In addition, returning the call request signal independently of the control station is practicable, which is capable of elevating the reliability of the public business digital mobile communication system.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. In a mobile communication system including a base station handling a signal for communication between a first mobile station and a second mobile station both of which are disposed in the base station zone of the base station, and a control station exchanging the signal with the base station based upon data for managing the communication, the base station comprising:

a receipt circuit receiving the signal from the first mobile station;

a transmission circuit transmitting the signal to the control station;

a radiation circuit radiating the signal toward the second mobile station; and a permitting/inhibiting circuit inhibiting the transmission circuit from transmitting the signal to the control station and permitting the radiation circuit to radiate the signal toward the second mobile station, according to a request at any time irrespective of an occurrence of trouble in a line between the base station and the control station.

2. A digital mobile communication system that includes a plurality of base stations, each base station having a zone corresponding thereto, any one of the base stations being capable of carrying out radio communication with a mobile station disposed in the zone corresponding to the one base station, and being capable of repeating communication between the mobile station in the zone corresponding to the one base station and another mobile station, when the another mobile station is disposed in the zone corresponding to either the one base station or another base station, via a control station serving as an upper layer, the system comprising:

a line supervision circuit monitoring a line between the one base station and the control station to prepare a line switch signal for switching the line upon detection of an occurrence of trouble in the line;

a signal return circuit returning a signal received from the one mobile station to radiate the signal over the zone corresponding to said any one of the base stations; and a communication circuit radiating broadcast information to all of the mobile stations in the zone corresponding to said any one of the base stations in response to reception of the line switch signal.

3. A digital mobile communication system, comprising a control station;

a plurality of base stations, each base station having a zone corresponding thereto, any one of the base stations being capable of carrying out radio communication with a mobile station disposed in the zone corresponding to said any one of the base stations, and being capable of repeating communication between the mobile station in the zone corresponding to said any one of the base stations and a destination mobile station, when the destination mobile station is disposed in the zone corresponding to either said any one of the base stations or another base station, via the control station serving as an upper layer, wherein the control station detects the zone in which the destination mobile station is presently disposed, with reference to position registration information, based upon identification data transmitted to the control station from the one mobile station, the identification data identifying the destination mobile station;

a line supervision circuit monitoring a line between the one base station and the control station to generate a line switch signal for switching the line upon detection thereby of an occurrence of trouble in the line;

a signal return circuit returning a signal received from the one mobile station to radiate the signal over the zone corresponding to the one base station; and a line switch circuit actuating the signal return circuit in response to the line switch signal so that when the line supervision circuit detects the trouble in the line, the signal return circuit radiates the signal over the zone corresponding to the one base station without reference to the position registration information.

4. The digital mobile communication system according to claim 3, wherein the line supervision circuit, the signal return circuit, and line switch circuit are disposed at the one base station, and in response to the line switch signal, the signal is radiated from the one base station over the zone corresponding to the one base station without transmission to receipt from the control station of any part of the signal.

* * * * *